UNITED STATES PATENT OFFICE.

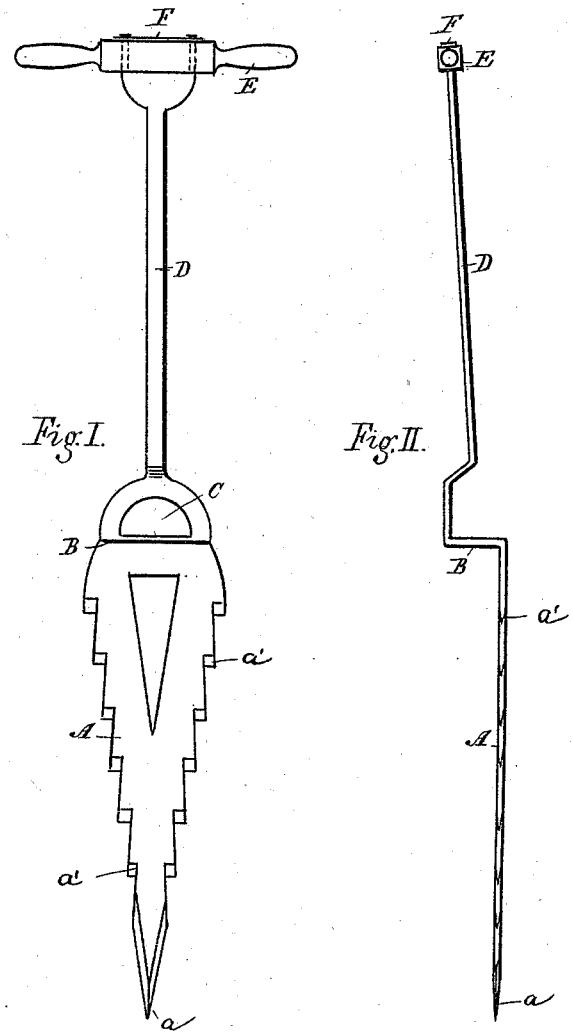

FREDERICK J. FENERAN AND ELBERT D. MILKS, OF MACHIAS, NEW YORK.

HAY-KNIFE.

SPECIFICATION forming part of Letters Patent No. 519,251, dated May 1, 1894.

Application filed October 23, 1893. Serial No. 488,919. (No model.)

*To all whom it may concern:*

Be it known that we, FREDERICK J. FENERAN and ELBERT D. MILKS, citizens of the United States, residing at Machias, in the county of Cattaraugus and State of New York, have invented a new and useful Improvement in Hay-Knives, which improvement is fully set forth in the following specification and accompanying drawings, in which—

Figure 1 is a front elevation of our improved hay-knife, and Fig. 2, a side view.

Our invention relates to improvements in hay-knives and its object is to provide a novel, inexpensive and effective device which may be operated solely by foot power or if desired by foot and hand power combined.

The invention comprises a double edged blade, stirrup or bearing for the foot, and a shank all of which are formed from a single piece of suitable sheet metal.

The peculiar construction and advantages of the tool will be readily understood by referring to the accompanying drawings, in which A indicates the blade having a spear point $a$ and a series of cutting teeth $a'$, formed as shown, on both edges. Immediately above the blade, the width of the metal plate is slightly contracted and bent horizontally at a right angle forming a shoulder or bearing B for the foot of the operative. The plate is then bent vertically and provided with a stirrup shaped opening C to admit the foot. Above this the plate is again contracted in width and forms the shank D which is first bent diagonally upward and backward to a point above the center of the shoulder B and then diagonally upward and forward at an obtuse angle as shown in the drawings. The upper end of the shank may be bifurcated and inserted in the handle E and secured therein by clinching the ends on a washer plate F.

It will be observed that the vertical planes of the blade and the shank do not correspond. Additional purchase is thus provided and the hands of the operative are not exposed to injury which would be caused by contact with the upright wall of the cut hay which faces him while operating the knife.

What we claim as new is—

A hay knife comprising the following features in its structure, viz., the spear pointed blade having cutting teeth on each edge, the contracted and horizontal shoulder above the blade forming a bearing for the foot, the opening C, for the foot, and finally the shank and handle, the blade and the shank being made integral, and the several parts forming the device as shown and described.

In testimony that we claim the foregoing we have hereunto set our hands, this 3d day of October, 1893, in the presence of witnesses.

FREDERICK J. FENERAN.
ELBERT D. MILKS.

Witnesses:
D. W. TILDEN,
S. M. BUTTON.